(No Model.)

J. MOSES.
SINK.

No. 540,753. Patented June 11, 1895.

Witnesses.

Inventor.
Joseph Moses.
by Fetherstonhaugh & Co ized bottom situated within the trough

UNITED STATES PATENT OFFICE.

JOSEPH MOSES, OF TORONTO, CANADA.

SINK.

SPECIFICATION forming part of Letters Patent No. 540,753, dated June 11, 1895.

Application filed October 4, 1894. Serial No. 524,917. (No model.)

*To all whom it may concern:*

Be it known that I, JOSEPH MOSES, merchant, of the city of Toronto, in the county of York, in the Province of Ontario, Canada, have invented certain new and useful Improvements in Sinks, of which the following is a specification.

My invention relates to improvements in a removable interior lining for a waste water sink and the object of the invention is to design such an interior lining for sinks as will serve the purpose not only of a dish pan and drainer but also of a tray for holding dishes when washed and a shield to prevent them from being broken if they should fall into the sink and it consists essentially of a sheet metal lining preferably supported away from the sides of the sink and having a trough formed around it whereby its centrally raised flat tray is formed considerably above the bottom of the trough and sink and in providing a perforated opening at the side of the trough with a shovel cover which is designed to be brought over the perforations as hereinafter more particularly explained.

Figure 1:
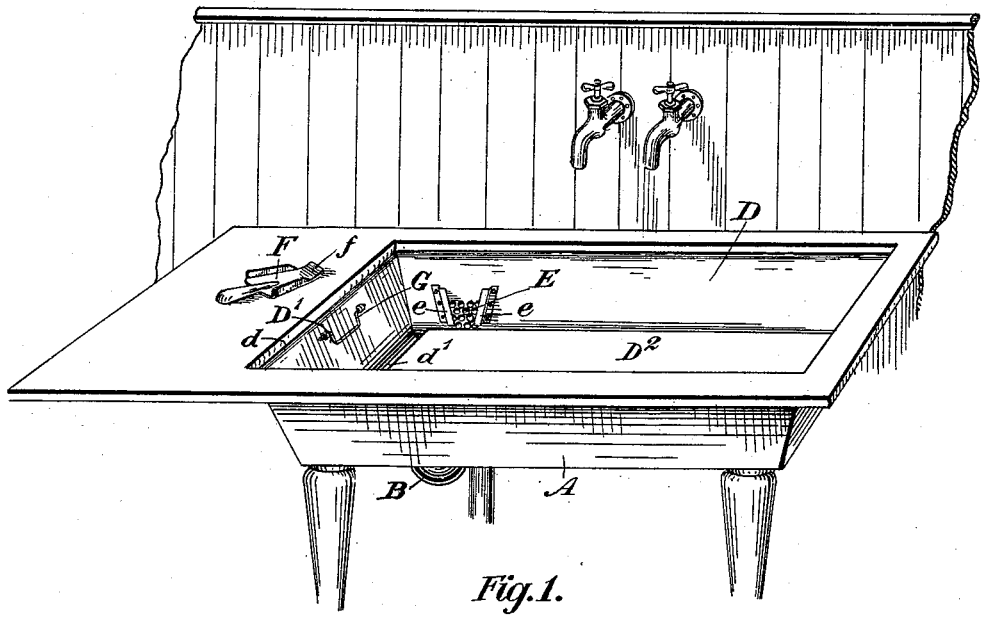
Figure 2:
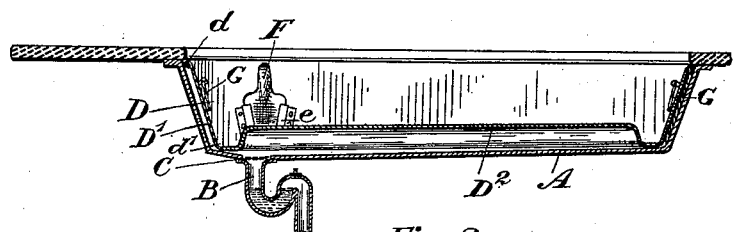
Figure 3:
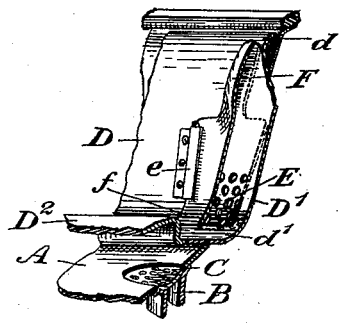

Figure 1 is a perspective view of a sink constructed in accordance with my invention. Fig. 2 is a longitudinal section through the sink. Fig. 3 is an enlarged detail of portion of the side of the sink and removable lining.

In the drawings like letters of reference indicate corresponding parts in each figure.

A, is the cast iron sink.

B, is the outlet leading into the waste pipe and C, is the strainer for such outlet.

D, is an interior lining which is made of sheet metal and the sides, D', of which have a bead, d, formed around them at the top and a trough, d', formed around at the bottom. The bottom, D², is flush with the top of the inner side of the trough, being thus removed quite a distance away from the bottom of the sink.

E, represents a series of perforations made in the side of the lining near the outlet, B, and extending down into the trough, d'.

e, represents the guiding ribs extending each side of the perforations, E, and secured to one side, D'.

F, is a shovel, which is provided with a curved end, f, to fit partially around the trough, so as to cover the holes in the trough.

Normally the shovel is placed in the position shown in Figs. 2 and 3, so as to cover up the perforations E, and allow the water to be retained within the lining.

In washing dishes the trough, d', may be filled up and the dishes washed from the tap and then placed on top of the centrally raised portion, D², where they may dry and which will act as a tray and a drainer for them, the water draining off them flowing back into the trough, d'. As the centrally raised portion is above the bottom of the sink and is supported from the upwardly extending sides of the trough it will be seen that should any china fall upon it it will give sufficiently so that such china will not be in danger of breaking as would be the case if it were to fall into the cast iron bottom of the sink were my lining, constructed as above, not provided.

When the dishes have been washed the shovel, F, should be removed and the water will pass down through the perforations, E, into the sink and opening, B. Any refuse from the dishes may be shoveled up out of the trough and removed from the sink by the shovel, F, which is made of the same width as the trough for this purpose. When the trough has been cleaned from such refuse the shovel may be placed back in position, so that the perforations, E, will be closed and it will be seen that there will be no danger of any disagreeable odor arising from the waste pipe.

By such a device as I provide it will be seen that it will be unnecessary to have a dish pan as the water from the tap may be let directly into the sink sheet metal lining where the dishes may be washed as hereinbefore described.

In order to provide for the removal of the lining I provide end handles, G.

What I claim as my invention is—

1. As a new article of manufacture, a removable sink lining of sheet metal having a trough formed around the bottom of the sides and a raised bottom situated within the trough as and for the purpose specified.

2. As a new article of manufacture, a removable sink lining of sheet metal having a trough formed around the bottom of the sides and raised bottom situated within the trough and end handles secured to the ends as and for the purpose specified.

3. In combination with the cast iron waste water sink, of a removable lining the sides of which have a bead around the tops to separate them from the sides of the sink, a trough formed around the bottom within the sides a raised central portion or bottom and a series of perforations made in the side at one end extending into the bottom of the trough and means for covering such perforations as and for the purpose specified.

4. In combination with the cast iron waste water sink, of a removable lining the sides of which have a bead around the tops to separate them from the sides of the sink, a trough formed around the bottom within the sides, a raised central portion or bottom and a series of perforations made in the side at one end extending into the bottom of the trough and guiding ribs, e, and a shovel designed to fit within the ribs, so as to cover the perforations and when removed to clean out the trough as and for the purpose specified.

JOSEPH MOSES.

Witnesses:
B. BOYD,
H. G. S. YOUNG.